United States Patent
Kopf et al.

(10) Patent No.: US 8,668,291 B2
(45) Date of Patent: Mar. 11, 2014

(54) METHOD AND APPARATUS FOR PROVIDING METAL CLAD FACADE

(75) Inventors: Bruce Arthur Kopf, Cedar Rapids, IA (US); Michael Allen Bowen, Keystone, IA (US); Todd Joseph Tunzi, St Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 497 days.

(21) Appl. No.: 11/944,113

(22) Filed: Nov. 21, 2007

(65) Prior Publication Data
US 2009/0126176 A1   May 21, 2009

(51) Int. Cl.
*A47B 96/04* (2006.01)

(52) U.S. Cl.
USPC ........................................ 312/405; 312/265.6

(58) Field of Classification Search
USPC ........... 312/265.5, 265.6, 405, 405.1; 62/340, 62/440; 52/455, 456, 784.12, 784.13
See application file for complete search history.

(56) References Cited

U.S. PATENT DOCUMENTS

| | | | |
|---|---|---|---|
| 3,008,253 A | 11/1961 | Bell, Jr. | |
| 4,423,581 A * | 1/1984 | Miller | 52/519 |
| 4,541,675 A * | 9/1985 | Everett | 312/265.5 |
| 4,798,424 A * | 1/1989 | Coates et al. | 312/257.1 |
| 4,862,642 A | 9/1989 | Alessi | |
| 4,966,004 A | 10/1990 | Midlang et al. | |
| 5,146,727 A * | 9/1992 | Hansson | 52/531 |
| 5,359,795 A | 11/1994 | Mawby et al. | |
| 5,364,178 A * | 11/1994 | Hofman et al. | 312/263 |
| 5,375,921 A * | 12/1994 | Tupa et al. | 312/257.1 |
| 5,611,610 A * | 3/1997 | Katz et al. | 312/263 |
| 5,685,623 A * | 11/1997 | Katz et al. | 312/263 |
| 6,065,820 A * | 5/2000 | Fleissner et al. | 312/265.5 |
| 6,220,680 B1 * | 4/2001 | Chen | 312/223.2 |
| 6,295,787 B1 * | 10/2001 | Lee | 52/784.15 |
| 6,651,449 B2 | 11/2003 | Heims et al. | |
| 6,652,983 B1 | 11/2003 | Mori | |
| 6,715,302 B2 | 4/2004 | Ferragut, II | |
| 6,751,409 B2 | 6/2004 | Nakamura | |
| 6,811,045 B1 | 11/2004 | Masker et al. | |
| 6,883,841 B2 | 4/2005 | Kawabata et al. | |
| 6,933,044 B2 * | 8/2005 | Ishikawa | 428/323 |
| 6,948,272 B1 | 9/2005 | Olivier et al. | |
| 6,979,135 B2 | 12/2005 | Ohe et al. | |
| 7,037,455 B2 | 5/2006 | Marine | |
| 7,137,272 B2 * | 11/2006 | Park et al. | 62/389 |
| 7,178,676 B2 | 2/2007 | Pulek et al. | |
| 7,192,102 B2 * | 3/2007 | Park et al. | 312/265.5 |
| 7,221,070 B2 | 5/2007 | Oba et al. | |
| 7,284,571 B2 | 10/2007 | Ozawa et al. | |
| 7,338,141 B2 * | 3/2008 | Kang et al. | 312/265.5 |

(Continued)

*Primary Examiner* — Daniel Rohrhoff

(57) ABSTRACT

An apparatus and method for a metal clad facade includes a thin metal cladding having at least one edge. The facade or the object with which it is associated has at least one edge around which the metal cladding edge can be wrapped. The wrapped edge could optionally be crimped. Optionally, exposed edges of the cladding could be covered by raised bosses or ribs on the façade. Optionally, a projection or extension of the cladding, oblique to other parts of the cladding, could extend into an opening in or near a surface of the facade or its underlying object. Wrapping of at least one edge with the metal cladding provides the appearance of a more substantial metal part than if the edge were not wrapped and provides for a more securement and durable attachment between the cladding and the underlying object.

11 Claims, 17 Drawing Sheets

(56) References Cited

U.S. PATENT DOCUMENTS

| | | |
|---|---|---|
| 7,415,688 B2 | 8/2008 | Sakakibara |
| 7,490,492 B2* | 2/2009 | Kim et al. .................. 68/12.27 |
| 2003/0164664 A1* | 9/2003 | Allexon et al. ............ 312/257.1 |
| 2004/0245900 A1* | 12/2004 | Parkkinen .................... 312/401 |
| 2005/0072178 A1* | 4/2005 | Park et al. ..................... 62/389 |
| 2005/0206281 A1* | 9/2005 | Wen-Lung ................. 312/265.5 |
| 2005/0268639 A1* | 12/2005 | Hortin et al. .................... 62/389 |
| 2006/0082073 A1 | 4/2006 | Dorner et al. |
| 2006/0226743 A1* | 10/2006 | Chen .......................... 312/223.2 |
| 2006/0265960 A1* | 11/2006 | Leimkuehler et al. .......... 49/501 |
| 2008/0203870 A1* | 8/2008 | Riley et al. ................. 312/265.6 |
| 2009/0126176 A1* | 5/2009 | Kopf et al. ................... 29/243.5 |

\* cited by examiner

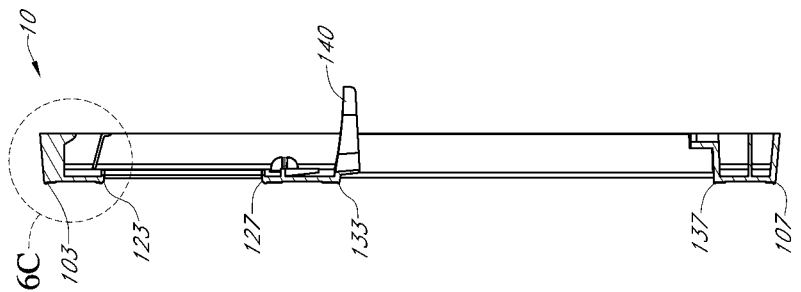
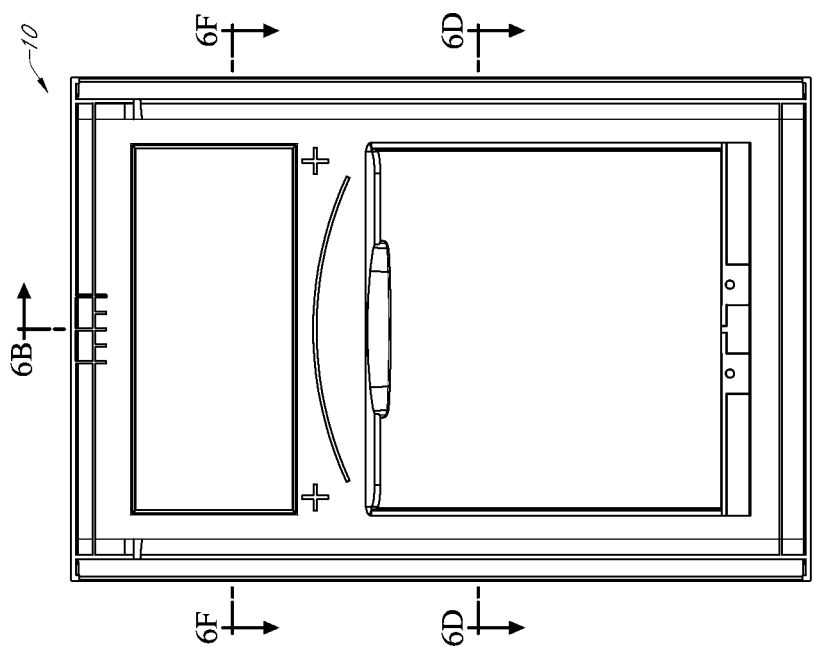

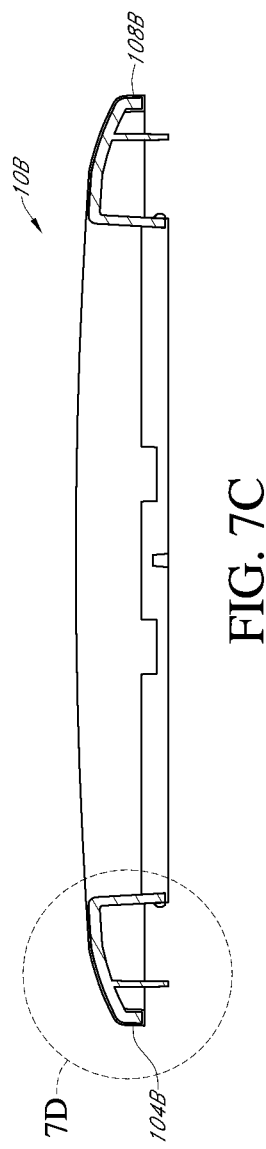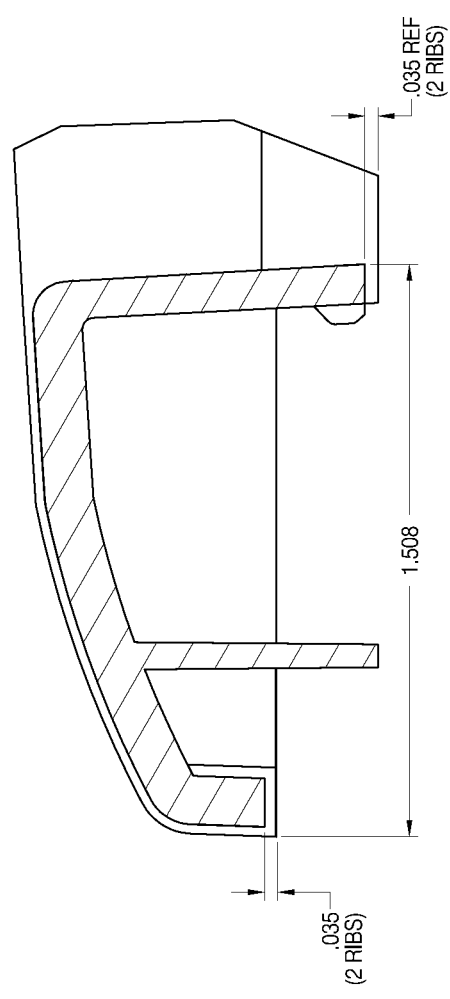

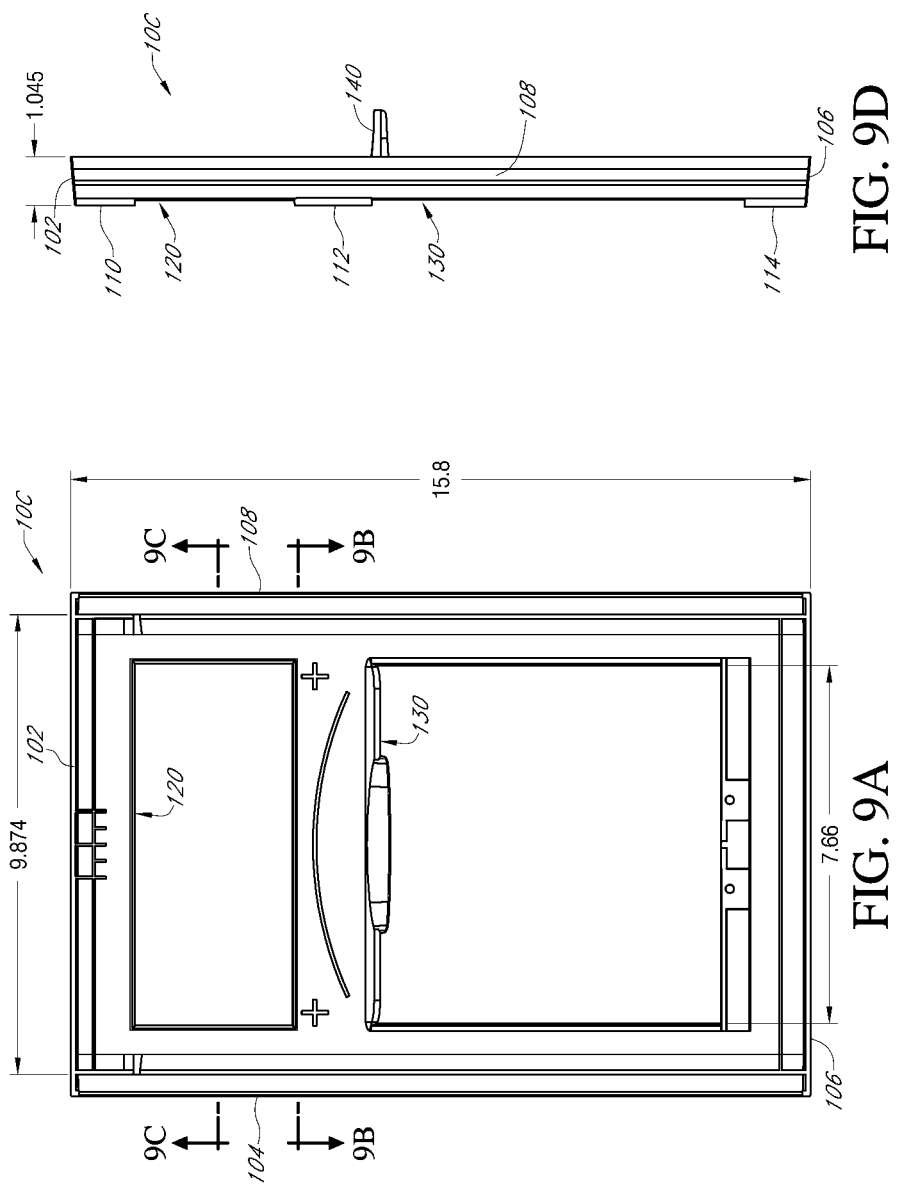

METHOD AND APPARATUS FOR PROVIDING METAL CLAD FACADE

I. BACKGROUND OF THE INVENTION

A. Field of the Invention

The present invention relates to metal clad or covered facades, and in particular, to a method and apparatus of mounting a metal cladding or covering to an underlying facade or face of a structure associated with a device or object.

B. Problems in the Art

The covering of one material over the facade or face of an underlying material is well-known in a variety of contexts and applications. It can be for functional reasons. For example, a textured, high co-efficient of friction layer can be placed over a smooth, low-coefficient of friction underlying material of an object to improve the coefficient of friction of the exterior of the object. The covering does not need to envelope all sides of the object, but just a surface, face, or façade of the object.

Alternatively, a cover or layer can be for purely cosmetic or ornamental purposes. The cover or over-layer can give a different appearance to the underlying material. An example is to clad the face or facade of a non-metal object with a thin metal skin or sheet to give the appearance that the underlying material is metal. In such instances the use of the term "façade" is particularly applicable, as in one conventional meaning of the word the function of the cladding or covering is to cover the front or facing side (the "façade") of the underlying part or object; but it also meets the other conventional meaning of the term by functioning to present a false, superficial, or artificial appearance or effect. As used here, the term "clad" or "cladding" means to cover one material with a thin piece of another material.

A specific example of cladding with metal exists with respect to household appliances. An underlying surface or part of the appliance can be clad, faced, or covered with a specific thin layer or sheet of metal. It can be for functional or cosmetic purposes, or both. Stainless steel cladding, as one example, may be desirable because it is deemed easier to clean or more sanitary in a kitchen environment than a painted or non-stainless steel surface. It can provide protection to the underlying surface or object. But stainless steel cladding also might be desired by a consumer because it gives the appearance of a professional-grade appliance, or might match other stainless steel appliances in that kitchen. There can be other purposes or functions associated with using a thin metal cladding over the facade of an underlying material or object.

Analogous reasons exist for applying metal cladding to other devices or objects. A few non-limiting examples of other devices or objects include furniture, lighting fixtures, computers, automobile dashboards, audio/video equipment, display cases, picture frames, hinges, and hardware.

One example of a conventional metal clad facade begins with drawing metal into a thin sheet. Perimeter edges of the sheet are held and a die or plug is pushed into the center of the sheet to create a desired cross-sectional profile. However, the final shape of the drawn metal is either substantially flat or at least has flat perimeter edges. Adhesive is used to affix the back of the drawn metal cladding in place to the face or facade of an object. This conventional method of creating metal clad facades presents at least several issues, some of which are antagonistic to one another.

First, it relies upon adhesive as the fastening method. If improperly applied, the adhesive may result in premature loosening of the cladding. Also, the adhesive may degrade over time or based on environmental conditions (e.g. heat or moisture) and result in loosening of the cladding.

Secondly, drawing metal into a sheet material with at least generally flat perimeter edges, and then adhering it to a surface, many times results in perimeter edges of the cladding being exposed to view. If the edges are exposed, it will be readily apparent that the object is simply faced or covered with a thin metal sheet. It will look like a laminate or thin layer cover instead of give an impression that the underlying object is metal. To combat this issue, sometimes a complimentary depression or recess is formed in the underlying material of the object into which the flat metal sheet or facade fits. This can help deter view of the edges of the cladding. However, it is difficult to manufacture both the recess and the cladding to fit precisely, especially in mass produced devices. Also, forming the recess involves more complexity and cost in the manufacture of the underlying material. Also, it still relies on adhesive to attach the cladding to the underlying façade.

Cost can many times be a significant factor in decisions whether to use a metal cladding. There is little incentive to design a metal cladding and underlying surface to be complex or expensive. But also, it usually is desirable to have a robust and long-lasting attachment of the cladding to the object. Therefore, there are competing interests when electing whether or not to use a metal cladding for the facade of an object. Those interests can be in conflict. For example, economy of materials, manufacture, and assembly can be one set of interests. But these interests can conflict with obtaining a better metal façade.

II. BRIEF SUMMARY OF THE INVENTION

It is therefore a principle object, aspect, feature, or advantage of the present invention to provide an apparatus and method for a metal clad facade of an object which improves over or solves the problems and deficiencies in the art.

Further objects, features, aspects, and/or advantages of the invention relate to an apparatus and method for a metal clad facade which:

a. provides for durable and long-lasting attachment of the metal cladding to its underlying object;
b. provides an enhanced facade appearance;
c. is non-complex and relatively economical; and
e. can be applied to a variety of objects.

In one aspect of the invention, a method of creating a metal clad facade for an object comprises providing an underlying object having outer and inner surfaces separated by a thickness, covering a portion of the outer surface with metal cladding, and bending or forming a portion of the cladding to wrap or extend across the thickness and then back around the inner surface of the object. Wrapping the cladding provides mechanical resistance to movement of the cladding relative to the object in one or more directions, mechanically secures that portion of the cladding to the underlying object, and enhances the facade by wrapping an edge of the facade with the cladding. An exposed edge of the cladding is therefore hidden.

The method optionally comprises crimping the wrapped portion of cladding around the thickness of the object to further resist movement of the cladding relative the object. The mechanical properties of the metal essentially clamp the wrapped portion to the object to help secure the cladding to the object.

The method optionally comprises wrapping a second portion of the cladding around another part of the object. The second wrapped portion can be positioned to resist movement of the cladding relative to the object in a different direction than the first wrapped portion to further enhance fastening of the cladding to the object. It can assist in securing that second portion of the cladding to the underlying object. The wrapped second portion can optionally be crimped around a thickness of the object.

The method further optionally comprises extending a portion or ear of the cladding obliquely from another portion of the cladding such that the oblique portion abuts the object in a manner which restrains or resists movement of the cladding relative the object in one or more directions. The oblique portion can have more than one side or edges that abuts different parts of the object to resist movement of the cladding relative to the object in more than one direction. The oblique portion can optionally be wrapped and/or crimped around a thickness of the object.

The method further comprises forming a boss or rib in the object which covers at least a portion of an exposed edge of the metal cladding. This enhances the facade appearance by blocking view of an otherwise exposed edge of the cladding. It also can serve to protect the exposed edge from being lifted or damaged. The boss or rib can be in a different direction than the direction of the wrapped edge.

A further optional aspect of the method comprises using adhesive between portions of the cladding and the object.

An apparatus according to one aspect of the present invention comprises an underlying object having a surface, face, or facade with at least one perimeter or internal edge. A metal cladding comprises at least one portion adapted to be bent or wrapped around the edge of the object. Optionally, the object is an appliance or part thereof.

The metal cladding optionally comprises one or more additional portions adapted to be wrapped around other edges of the object. In one example, the edges of the object are spaced apart from one another and the portions of the cladding are wrapped in opposite directions. One example is wrapping opposite sides of the façade.

The apparatus optionally comprises one or more portions of the cladding extending at an oblique angle from another portion of the cladding, each of the one or more portions having edges which abut edges of the object to restrain relative movement between the cladding and the object. One or more oblique portions may also be wrapped around an edge of the façade.

The apparatus optionally comprises a boss or rib on the object aligned to cover an exposed edge of the cladding. The boss or rib can optionally be in a different direction than the wrapped edge.

These and other objects, features, aspects, or advantages of the present invention will become more apparent with reference to the accompanying specification and claims.

III. BRIEF DESCRIPTION OF THE DRAWINGS

FIG. 6A is a back elevation view of FIG. 5.

FIG. 6B is a sectional view taken along line 6B-6B of FIG. 6A.

FIG. 7C is an enlarged section view taken along line 7C-7C of FIG. 7A.

FIG. 7D is an enlarged view of the circled area 7D of FIG. 7C.

FIG. 9A is similar to FIG. 7A but is a back elevation of the alternative plastic ice/water dispenser face plate 10C of FIG. 8.

FIG. 9D is a right side elevation of FIG. 9A.

IV. DETAILED DESCRIPTION OF EXEMPLARY EMBODIMENTS

A. Overview

Figure 1:
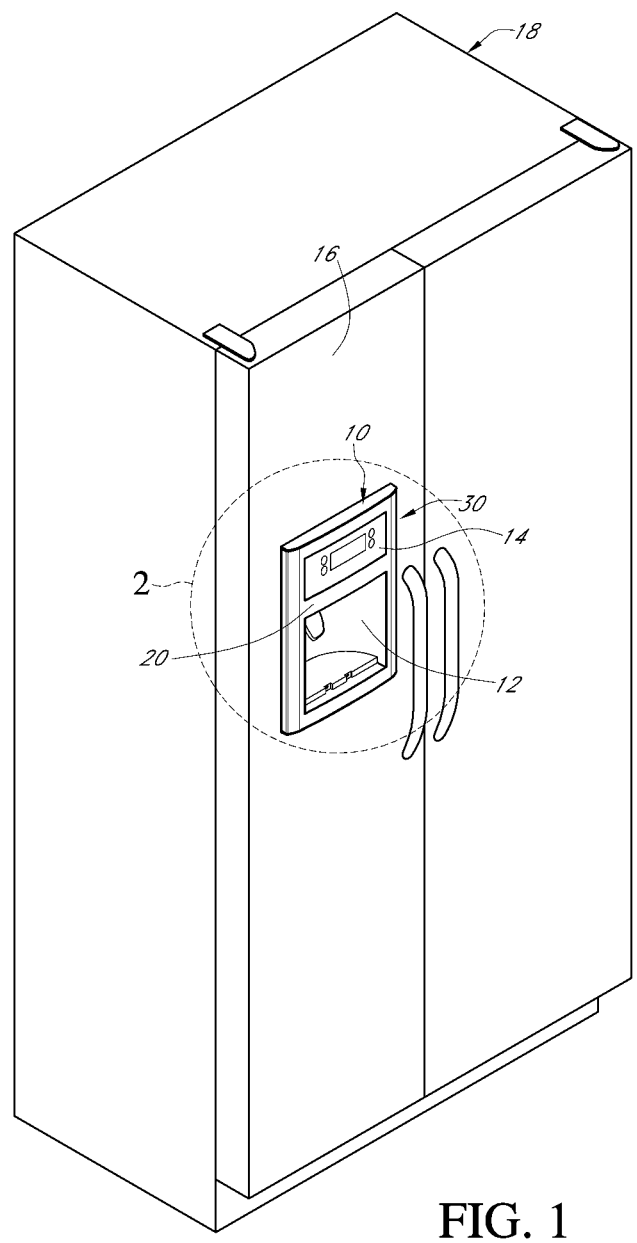
FIG. 1 is a perspective diagrammatic illustration of a refrigerator appliance that includes an in-door water and ice dispenser framed by a plastic face plate with metal clad facade according to an exemplary embodiment of the present invention.

For a better understanding of the invention, several examples of forms the invention can take will now be described in detail. Frequent reference will be made to the accompanying Figures. Reference numerals will be used to indicate certain parts or locations in the Figures. The same reference numerals will be used to indicate the same or similar parts or locations throughout the Figures unless otherwise indicated.

The exemplary embodiments will be described in the context of a household appliance; in particular, a refrigerator having a face plate which can be snapped or attached to the exterior side of a refrigerator door around an in-door ice/water dispenser. These specific exemplary embodiments are not intended to be, nor should they be understood to be, inclusive or exclusive of all possible applications or objects. It is to be understood that the invention is applicable to a wide variety of objects and applications. This includes objects or applications related to other parts of refrigerators, to other household appliances, and to non-appliance objects. A few examples have been previously mentioned. The invention is limited solely by the appended claims and not by the examples given herein.

B. Metal Clad Face Plate Assembly 30 on Refrigerator Door 16

Figure 2:
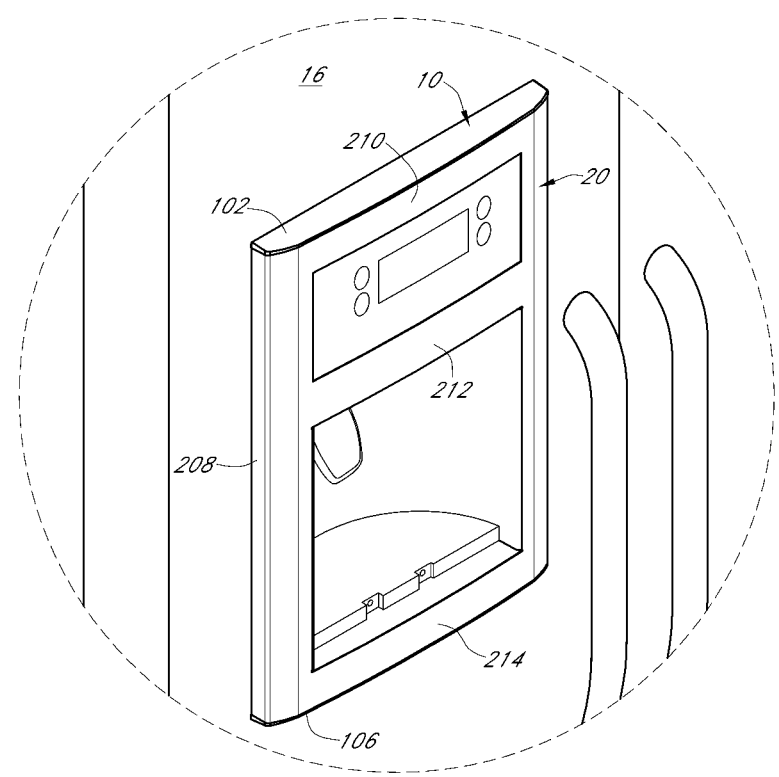
FIG. 2 is an enlarged view of the metal clad ice/water dispenser face plate of FIG. 1 taken along the dashed line circle 2 of FIG. 1.
Figure 3:
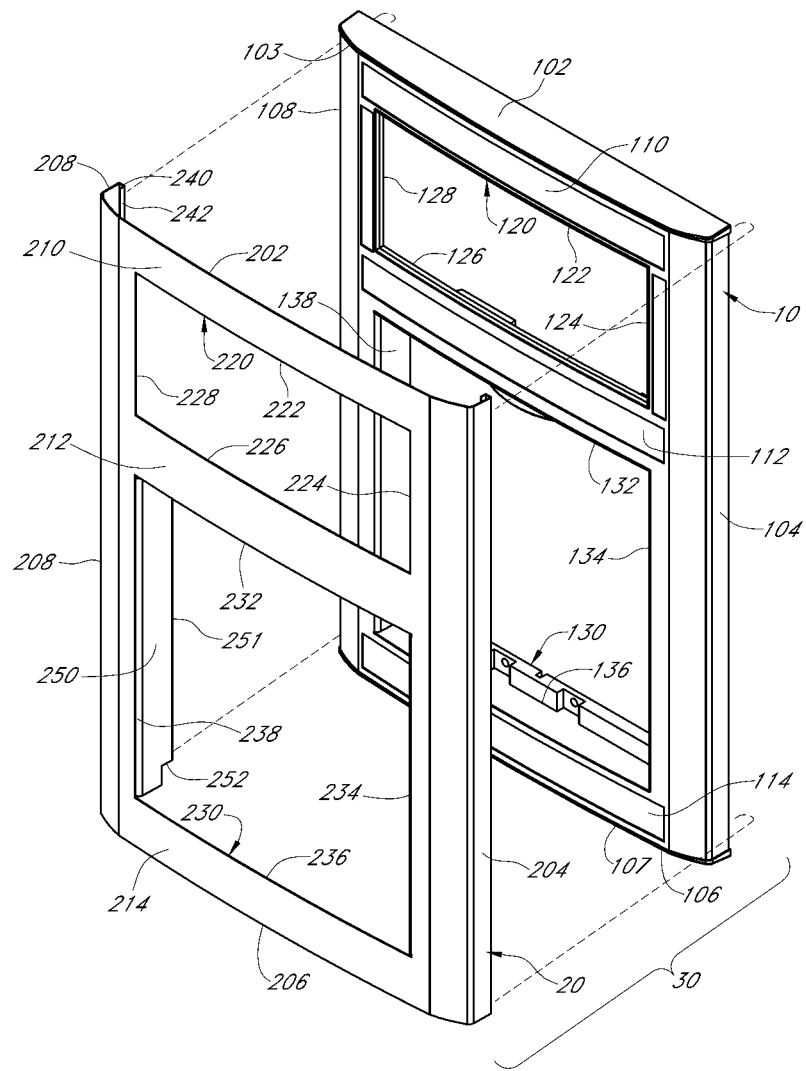
FIG. 3 is an exploded view of the metal cladding and the plastic ice/water dispenser face plate which make up the metal clad face plate of FIGS. 1 and 2.

An ice/water dispenser face plate assembly 30, according to an exemplary embodiment of the invention, is shown in exploded form in FIG. 3 and in assembled form in FIGS. 10A-G. Face plate assembly 30 frames the in-door ice/water dispenser 12 and control unit display 14 in door 16 of a refrigerator 18 (see FIGS. 1 and 2). In this example, outer surface of door 16 is stainless steel.

Face plate assembly 30 has two main components. The first is a thin stainless steel metal cladding 20 (shown alone, in a pre-installed form, in FIGS. 4A and B). The second is a plastic face plate 10 which snaps or attaches to the stainless steel door 16 of refrigerator 18 (FIGS. 1 and 2).

Stainless steel cladding 20 covers a substantial portion of the exposed surfaces or facade of plastic face plate 10 and provides the appearance of being substantially integrated or integral with face plate 10. In this example, this creates the appearance that face plate 10 is integral with or even a part of the stainless steel door 16 of refrigerator 18, even though face plate 10 itself is of a different material and color than stainless steel.

One of the features of metal clad face plate assembly 30 is its ornamental or cosmetic appearance. It gives the appearance of a substantially stainless steel piece. As indicated in FIG. 2, and as will be explained in more detail later, the psychological impression that piece 30 is stainless steel is enhanced by metal cladding 20 wrapping around several of the edges of the underlying plastic face plate 10, masking from view certain edges of metal cladding 20 as well as the sides or edges of the underlying plastic face plate 10. Even though some portions of the plastic underlying face plate 10 are exposed to view and visible (see, e.g., top plate 102 and bottom plate 106 in FIG. 2), the vertical outside edges between top and bottom plates 102 and 106 are wrapped by metal cladding 20 so no portions of plastic face plate 10 or edges of cladding 20 are exposed along those sides. Additionally, interior vertical edges of plastic face plate 10 are also covered, as will be explained further below. Thus, metal clad face plate assembly 30 has a very finished stainless steel look. It appears much more substantially stainless steel than just a thin stainless steel sheet glued on a surface.

As can be appreciated, even though some plastic portions are visible when installed, if desired at least those visible or exposed portions of plastic face plate 10 can be made of a color and surface that is complementary to stainless steel. For example, face plate 10 can be made of a rigid black plastic with neatly formed smooth visible non-clad surfaces to provide a very finished look for the assembly 30, as well as refrigerator 16. Other colors, surface treatments, surface textures, and configurations are possible, according to need or desire.

Another feature of assembly 30 is that metal cladding 20 is more robustly and durably mounted to plastic facade than by just adhesive. Mechanical properties of metal cladding 20 are used to connect and mechanically resist separation of metal cladding 20 relative to plastic face plate 10. Therefore, metal clad face plate assembly 30 produces several benefits that are not achieved by flat metal cladding that is simply adhered to a surface of an underlying piece. Assembly 30 does so by a combination of what can be antagonistic factors to produce these benefits.

C. Metal Cladding 20

Figure 4A:
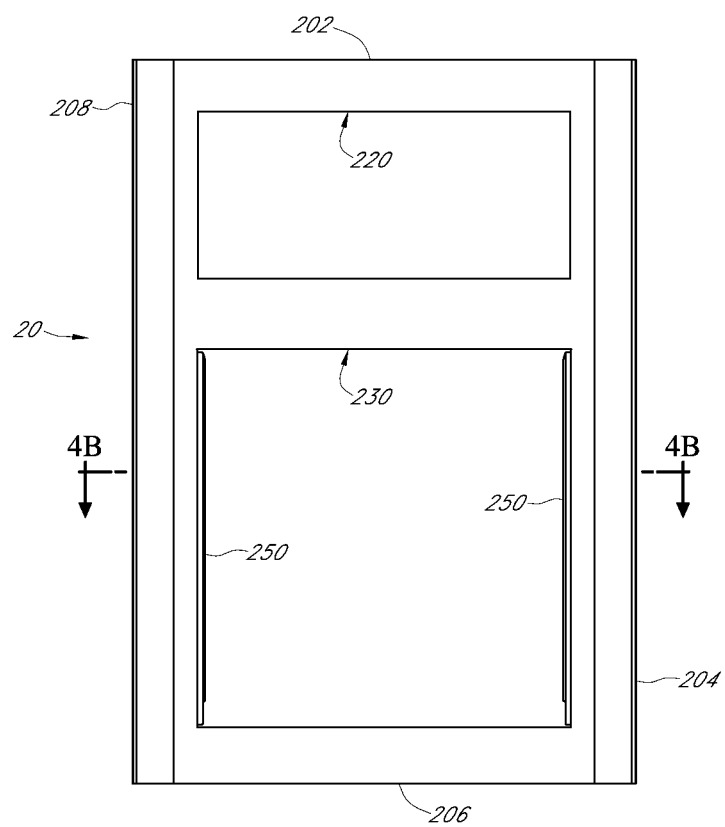
FIG. 4A is a front elevation view of just the metal cladding of FIG. 3.

Metal cladding 20, here 0.015 inch thick type 304 stainless steel with a brushed finish (by wet polish) to match type 301 stainless steel, is initially formed into the shape of FIGS. 4A and B. Two openings 220 and 230 are formed between upper and lower edges 202 and 206 (see FIG. 4A). Opposite sides 204 and 208 are bent at essentially right angles to the general plane of cladding 20 with slightly curved transition areas before each right angle edge 204 and 208 (see FIG. 4B). The shape of cladding 20 is manufactured by known techniques to be complementary to the facade of face plate 10.

Cladding 20 can be made of a wide variety of metal materials. Other examples are 0.022 thick type 0437 aluminum and 0.023/0.025±0.0015 aluminum from Alcoa. The metal can be finished. For example a matte finish could be applied to either aluminum or stainless steel. Another example is pre-painted aluminum with removable film. Colors for the finish or paint can also vary according to desire. For example the color could be oiled bronze for aluminum to match a bronze colored appliance door or to complement a door of different material or color (e.g. a different metal, a painted door, or a wood door). A number of variations are, of course, possible.

Figure 4B:
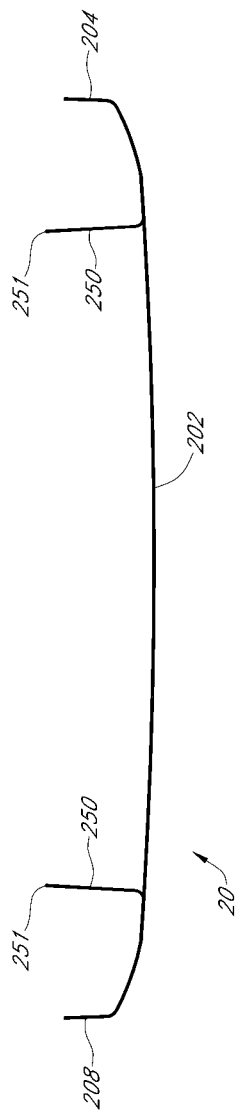
FIG. 4B is a top end view taken along line 4B-4B of FIG. 4A, in enlarged scale.

Two forwardly extending flanges or ears 250 are formed at opposite sides of bottom opening 230 in cladding 20 (see FIGS. 4A and 4B). Ears 250 can simply be bent obliquely to the general plane of cladding 20 after making appropriate cuts in the original stainless steel sheet from which cladding 20 originates. Formation of the geometry of cladding 20 can be produced by conventional metal manufacturing methods. The metal is malleable, allowing it to be curved or bent but, once bent, the metal will stay in that orientation.

It is pointed out that, in this embodiment, there are no inwardly extending ears from any part of upper opening 220 in metal cladding 20. However, such would be possible, if desired. In this case, opening 220 frames a display which would have a clear lens or screen cover, and would provide a finished look.

Metal cladding 20 therefore has bent opposite vertical edges 204 and 208, and bent interior ears 250, all of which are bent in the same direction, namely outward from the back or inner side of cladding 20. They also are elongated in the long or vertical direction of cladding 20. The remaining edges of cladding 20 are in the same general plane as the majority of the surfaces of cladding 20.

D. Plastic Face Plate 10

FIGS. 5 and 6A-F show just plastic face plate 10 of FIG. 3 in detail. As can be seen, the vertical length, horizontal width, and shape of the front face or facade of plastic face plate 10 is generally complementary to cladding 20 of FIGS. 4A and B.

Figure 5:
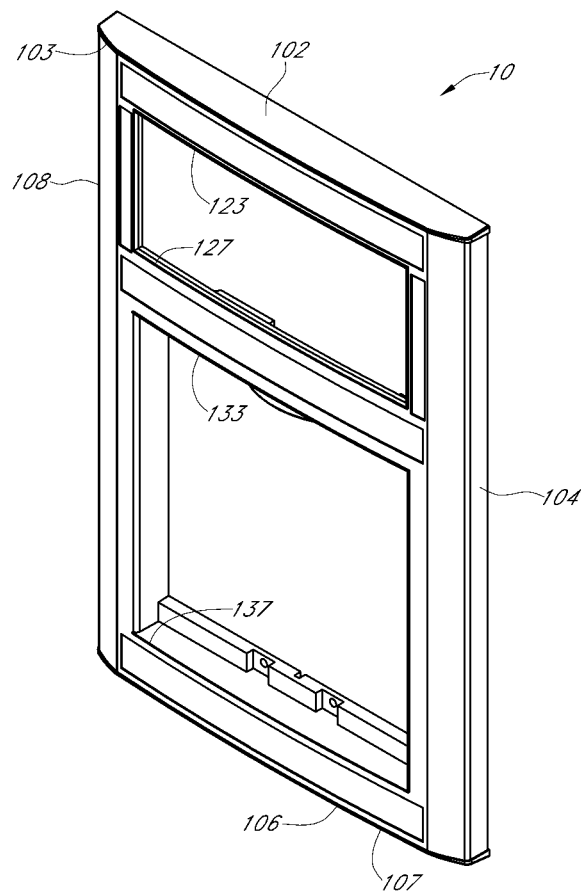
FIG. 5 is a perspective view of a first version of just the plastic ice/water dispenser face plate of FIG. 3.
Figure 6C:
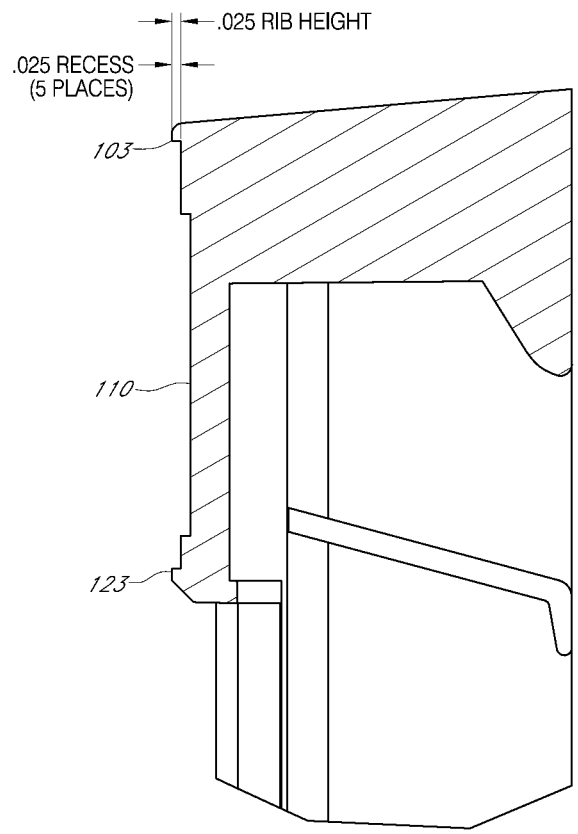
FIG. 6C is an enlarged view taken along circle 6C of FIG. 6B.
Figure 6D:
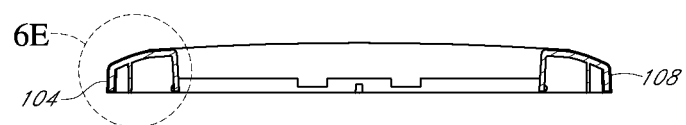
FIG. 6D is a section view taken along line 6D-6D of FIG. 6A.
Figure 6E:
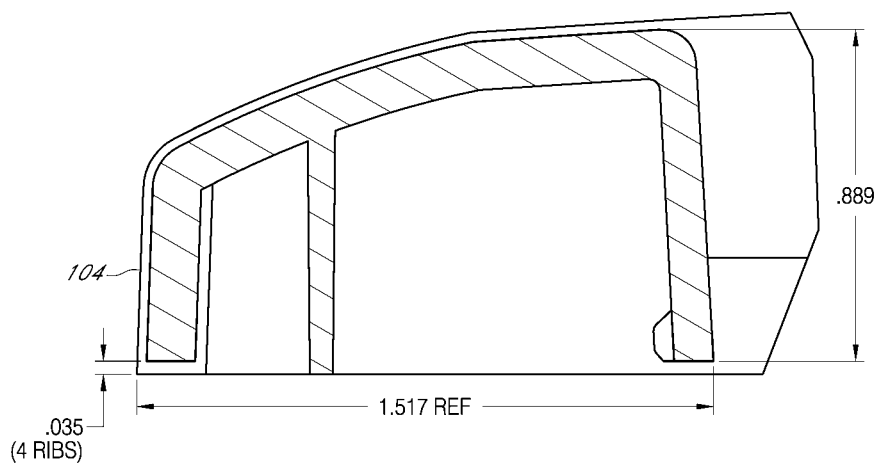
FIG. 6E is an enlarged view of the circled area 6E of FIG. 6D.
Figure 6F:
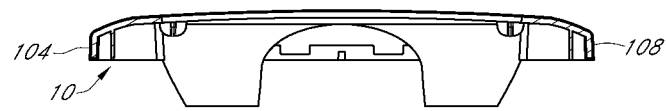
FIG. 6F is a section view taken along line 6F-6F of FIG. 6A.
Figure 7B:
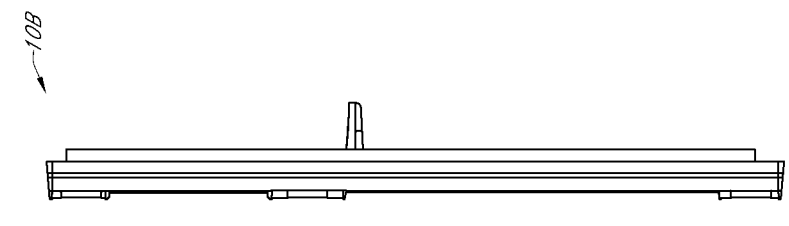
FIG. 7B is a side elevation view of FIG. 7A.
Figure 7A:
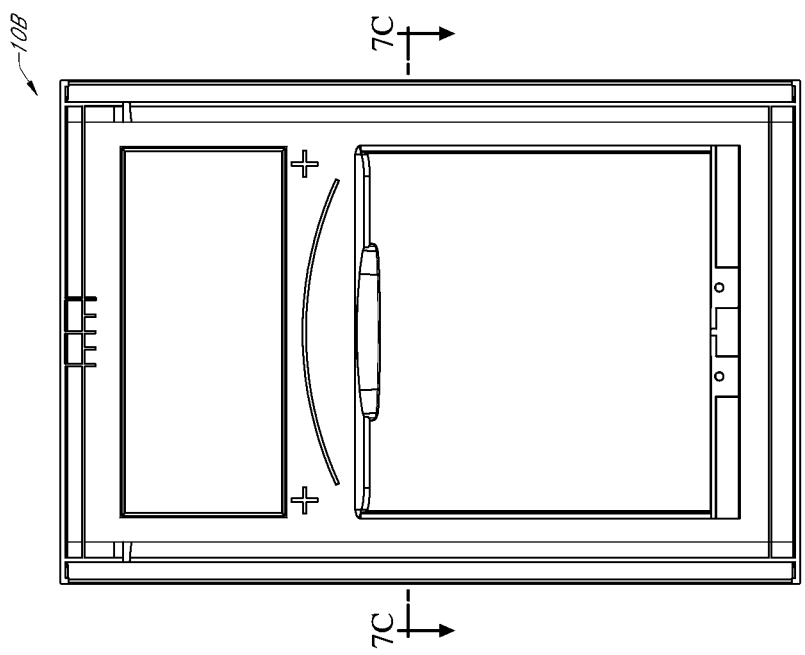
FIG. 7A is a back elevation view of a slightly different alternative configuration 10B for face plate 10 of FIG. 5.
Figure 8:
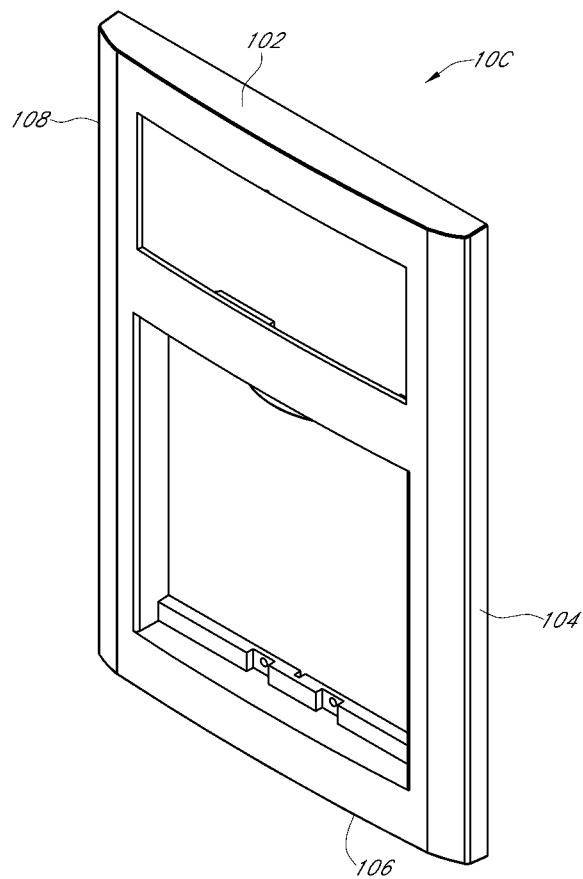
FIG. 8 is a perspective view of an alternative version 10C of a plastic ice/water dispenser face.
Figure 9B:
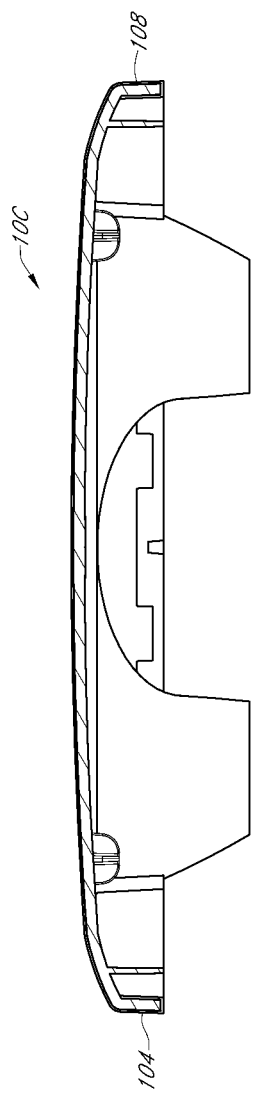
FIG. 9B is a sectional view taken along line 9B-9B of FIG. 9A.
Figure 9C:
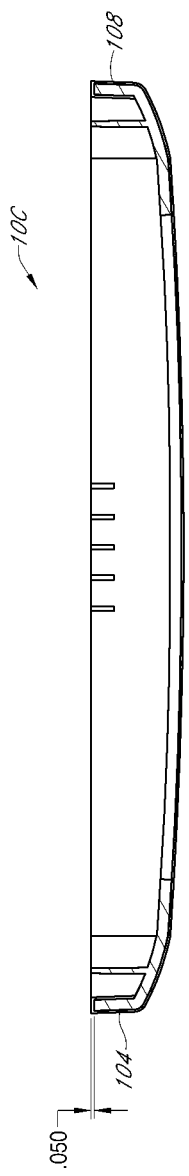
FIG. 9C is a sectional view taken along line 9C-9C of FIG. 9A.

Face plate 10 also has what will be called a thickness between front and back (see FIGS. 5 and 6B-E). As shown in the Figures, the facade of face plate 10 has generally smooth surfaces. The back or refrigerator-facing side has a variety of hollows defined by a plurality of walls extending rearward to distal edges. FIGS. 6D-F illustrate by cross section that plastic facade has opposite sides 104 and 108 that are essentially perpendicular to the front plane of face plate 10. Those sides have thickness (the distance between front and back) of several times the thickness of metal cladding 20 (see FIGS. 10D-F).

Plastic face plate 10, here made of PVC (POLYONE GEON HTX H6215), can be produced by conventional means (e.g. molded). It has two openings 120 and 130 between upper and lower surfaces 102 and 106 which generally correspond to openings 220 and 230 in cladding 20. Opposite sides or side walls 104 and 108 are shaped in complementary fashion to the opposite sides forming bent edges 204 and 208 of metal cladding 20. These side walls of plastic face plate 10 provide edges around which corresponding edges of metal cladding 20 can be bent and wrapped.

Face plate 10 has some additional features. Top and bottom surfaces 102 and 106 each have a forward extending rib or lip 103 and 107 respectively (see FIGS. 3 and 6B). Ribs 103 and 107 extend in front of lateral facade surfaces 110 and 114, respectively. Surfaces 110 and 114 are adapted to receive the back sides of corresponding lateral portions 210 and 214 of cladding 20 (see FIG. 3). Similarly, there are forwardly extending ribs 123 and 127 on top and bottom sides of opening 120 and forwardly extending ribs 133 and 137 on top and bottom sides of opening 130 of facade (see also FIG. 6B). Note that each of these ribs extends laterally or horizontally across at least a portion of plastic face plate 10 (as compared to the vertical bent edges of cladding 20 described above). With regard to height of ribs or lips 103, 123, 127, 133, 137, and 106, they project outwardly at least 0.025 inch and are at or approximately 0.025 inch in thickness to cover a cladding thickness of at or under 0.025 inches. They can be adjusted in dimension as desired or as needed. They can be adjusted in dimension for other sized cladding.

As indicated in FIG. 5, face plate 10 also includes recesses along portions 110, 112, and 114. These are designed to receive and position adhesive; in particular, a strip of adhesive tape that could be used to provide supplemental fastening of metal cladding 20 to the facade of face plate 10. Such adhesive is optional.

The facade of face plate 10 (or the entire face plate 10) can be intentionally colored to match or complement a selected metal cladding. For example, rigid PVC could be colored white, black, or bisque; three traditional colors for kitchen appliances. Likewise, metal cladding 20 could be painted or finished to other than its normal metal look (e.g. painted white, black or bisque). The designer can color all or part of the facade of face plate 10 to either match or complement cladding 20 and/or door 16.

Rigid PVC has been mentioned as the material of face plate 10. Others plastics and other materials, even metal, are possible.

E. Assembly of Metal Cladding 20 to Plastic Face Plate 10

FIGS. 10A-F illustrate how cladding 20 is placed in assembled position on face plate 10 to form metal clad face plate assembly 30.

By referring also to the exploded view of FIG. 3, cladding 20 in the form of FIGS. 4A and B is moved into general correspondence with the front or facade of face plate 10. Cladding 20 and face plate 10 are then converged so that they come into abutment with the following relationships:

(a) Horizontal top and bottom edges 202 and 206 of metal cladding 20 are covered by raised ribs 102 and 206 respectively of face plate 20 all across the assembly 30.

(b) Horizontal edges 222, 226, 232, and 236 of cladding 20 are covered by raised ribs 122, 126, 132, and 136 of plastic face plate 10 respectively.

(c) Outer bent vertical side edges 204 and 208 of cladding 20 cover and extend past the rear plane of sides 104 and 108 of face plate 10.

(d) Inner bent ears 250 (left and right) of cladding 20 cover and extend past the rear plane of inner walls 134 and 138 of opening 130 in the bottom half of face plate 30.

As can be appreciated, these relationships between parts of cladding 20 and face plate 10 guide cladding 20 into position on face plate 10. For example, face plate 10 has to fit between opposite vertical edges 204 and 206 of cladding 20. Ears 250 of cladding 20 have to fit into opening 130 of face plate 10. Transverse sections 210, 212, and 214 of cladding 20 nest between the raised rib pairs 103/123, 127/133, and 137/107, respectively of face plate 10. Thus, there is basically both top-to-bottom and side-to-side preliminary positioning of metal cladding 20 to face plate 10.

Note also that edges 204 and 208 cover almost all the vertical sides 104 and 108 of face plate 10, and ears 250 cover almost all the thickness of the vertical sides of opening 130 in face plate 10. Raised rib pairs 103/123, 127/133, and 137/107 of face plate 10 substantially cover and protect the exposed horizontal edges of cladding 20.

In this example, prior to positioning cladding 20 on face plate 10, double-sided adhesive strips or tape (not shown) are/is placed in the pre-formed rectangular depressions or recesses across transverse sections 110, 112, and 114 of face plate 10. Once cladding 20 is brought into abutment with face plate 10, those adhesive strips will help hold cladding 20 in position.

In this example, as a part of final assembly, the very distal portion of each edge 204 and 208 of metal cladding 20 is bent essentially 90 degrees in two places (see reference numerals 240 and 242 in FIG. 3 and FIG. 10D), essentially inwardly and then back towards the main portion of cladding 20. These bends 240/242 wrap metal cladding 20 around the rearwardmost edges of vertical sides 104 and 108 of plastic face plate 10 (see FIGS. 10D and F), and further hide from view underlying plastic surfaces. Then, using conventional methods, the bent portion 242 of each of vertical edges 204 and 208 is crimped towards its corresponding edge 204 or 208, with the plastic 104 or 108 there between. The crimping force is selected and controlled to slightly converge those parts of cladding 20 towards one another without materially damaging the plastic at 104 or 108. The material properties of metal cladding 20 are used to mechanically clamp the vertical edges 204 and 208 of metal cladding 20 to opposite sides of plastic face plate 10. The mechanical configuration and mechanical forces securely hold those opposite vertical side portions of the metal cladding 20 down against plastic face plate 10 and robustly and durably resist lifting of those portions from face plate 10. It also provides a highly finished look.

Figure 10C:
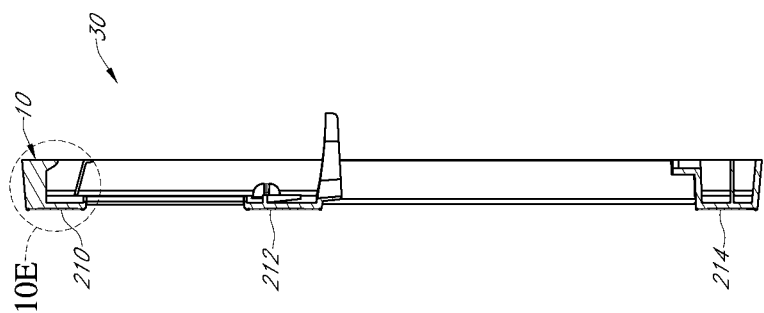
FIG. 10C is a sectional view taken along line 10C-10C of FIG. 10A.
Figure 10A:
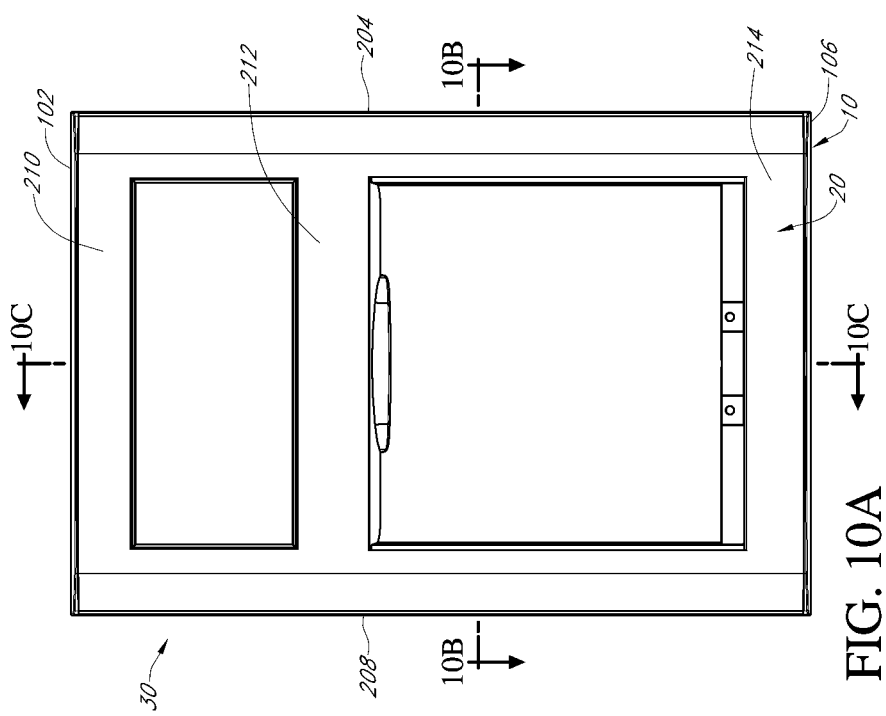
FIG. 10A is a front elevation assembled view of both the metal cladding and ice/water dispenser face plate of FIG. 3.
Figure 10B:
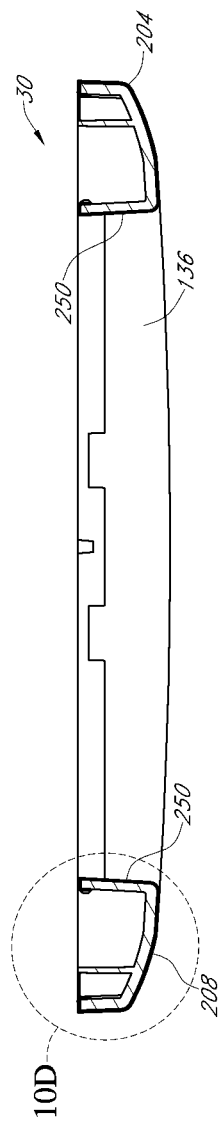
FIG. 10B is a sectional view taken along line 10B-10B of FIG. 10A.
Figure 10D:
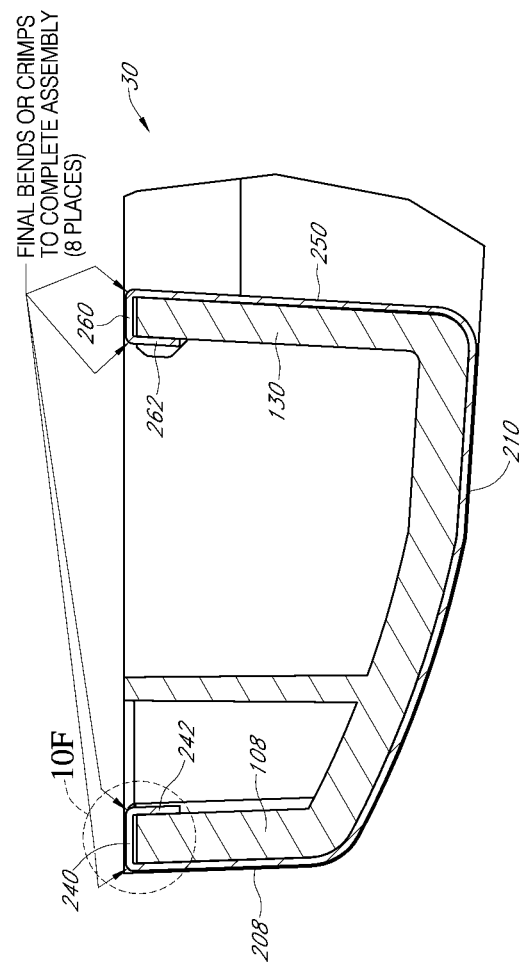
FIG. 10D is an enlarged detail view taken along circle 10D of FIG. 10B.
Figure 10E:
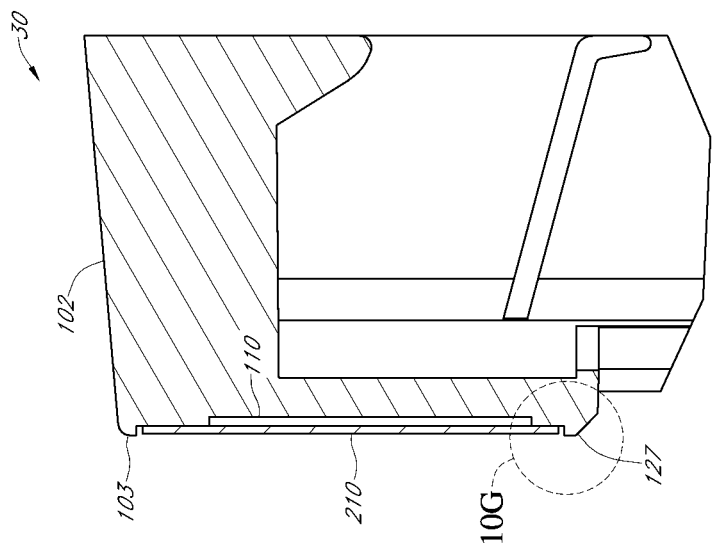
FIG. 10E is an enlarged detail view taken along circle 10E of FIG. 10C.

Likewise, the very distal portion of each ear 250 has similar bends 260 and 262 (see FIG. 10D). Bent portion 262 of ears 250 can also be crimped towards its corresponding ear without materially damaging the intervening plastic at reference numerals 134 and 138. This additional wrap-around crimping can be accomplished for ears 250 on opposite sides of opening 130 in face plate 10 (see FIG. 10D—right hand side). This resists lifting of those crimped portions of cladding 20 from face plate 10.

As indicated in the Figures, each bent section 240/242 and 260/262 is each only a fraction of an inch in total width to wrap the edge of the plastic face plate 10 (e.g., approximately 1/10 of an inch). Conventional bending and crimping machines or tools can be configured to create these bends and the crimping.

Thus, wrapping and crimping of cladding 20 is accomplished both on opposite outer vertical sides of face plate 10, as well as on opposite inner vertical sides of opening 130 in face plate. Cumulatively this further enhances the durable fastening of cladding 20 to face plate 10. Wrapping (without crimping) deters movement of cladding 20 side to side. Crimping of cladding edges 204 and 208 further deters movement of cladding 20 relative to face plate 10 (in essentially all directions). Wrapping and crimping of ears 250 does so also. But furthermore, as indicated in the Figures, the vertical length of ears 250 closely matches the height of opening of 130 in face plate 10. The top and bottom edges of ears 250 can also function as mechanical stops restraining cladding 20 from any substantial longitudinal movement relative face plate 10, regardless of the wrapping and crimping.

As indicated in the Figures (see for example FIG. 10G at reference numeral 211 and FIG. 10F at reference numeral 241), some clearance is intentionally designed into assembly 30 between edges of cladding 20 and the raised ribs or between the wrapped portions of cladding and the back edges of face plate 10. Such clearance is designed to compensate for manufacturing tolerances, as well as some expansion or contraction of the parts. In the case of this example, clearance 241 in FIG. 10F allows for a small space between bent portion 240 of cladding 20 and the adjacent end edge surface of face plate side wall 108. This can also facilitate the crimping action or forces at those positions. Also, clearance 211 of FIG. 10G (e.g. on the order of 0.015 inch typical), allows some range of tolerance between exposed edges of cladding 20 and the raised ribs (e.g. rib 127). This helps insure that cladding 20 will fit well and the exposed cladding edges will be covered and protected by the raised ribs. Closer tolerances or even no tolerance can be designed, if desired. As shown in the assembled views of metal clad face plate assembly 30 in FIGS. 10A-10G, raised ribs cover exposed horizontal edges 202, 222, 226, 232, 236, and 206 (from top to bottom) of metal cladding 20 when installed on plastic facade. They substantially cover those edges of metal cladding 20 so that these edges are not exposed when installed on face plate 10. Therefore, one viewing assembly 30 would not readily identify stainless steel cladding 20 as being simply a thin metal cover over another part (it promotes an appearance that the part may be metal and not just metal clad). Additionally, those raised ribs help protect the edges of the thin metal cladding from exposure to such things as fingers, finger nails, utensils, silverware, edges of glasses and cups, and the like, which could catch on and damage or pull away those edges of cladding 20 from face plate 10.

As can be therefore be appreciated, assembly 30 presents a highly finished metal appearance to the combination even though (a) it is merely a metal clad facade and (b) it intentionally leaves some portions of the non-metal underlying face plate exposed to view and visible when installed. These are somewhat conflicting concepts. A metal look is desired but some underlying plastic is intentionally exposed.

But furthermore, the metal cladding is very securely mounted on the face plate by (a) more than just adhesive and (b) with mechanical methods. These also can be somewhat conflicting. A thin metal cladding is applied to the facade of the underlying part, but complexity and cost is added for the mechanical fastening to achieve a more robust securement of the cladding and some of its edges.

However, assembly 30 is specifically designed to be manufactured and assembled in a relatively simplified and efficient manner. The bending and crimping actions can be completed in an efficient manner with conventional equipment. Those skilled in the art can calibrate the equipment to make the bends and crimp, particularly on plastic face plate 10, with forces that do not damage or break the pieces of plastic face plate 10 involved around the bending and crimping. Furthermore, bending and crimping is only along vertical portions of cladding 20. Thus, all of those steps can be in the same direction. This avoids complexity related to performing bending and crimping actions in more than one direction. It also avoids complexity and well-known difficulties involved in trying to bend and/or crimp metal around corners. Forming metal, even thin metal, around corners is not only difficult to do; it is difficult to make the final product appear highly finished. Thus, the assembly method of this example (a) wraps and crimps only vertical edges of cladding 20 on vertical edges of face plate 10 and (b) protects and hides only horizontal edges of cladding 20 with raised horizontal ribs on face plate 10. This mixture of different techniques produces advantageous results. The added complexity of manufacture and assembly is not significantly more than drawing a metal cladding and gluing it to a surface. But the attachment of the cladding is more robust and secure. The appearance of the final assembly is more substantially a metal look, even though it intentionally leaves exposed some of the underlying non-metal material.

During manufacturing and assembly, a protective removable plastic film or release sheet could be placed over the outer-facing metal cladding 20 to protect it. This could be left in place during shipping to a retail or end user's site and then easily removed.

Figure 10F:
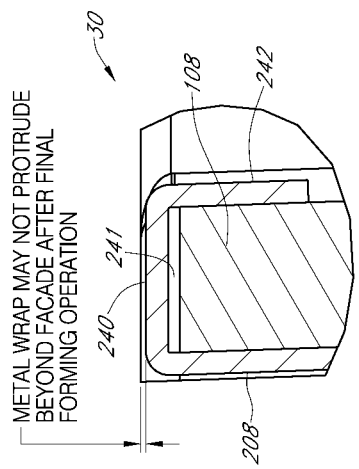
FIG. 10F is an enlarged detail view taken along circle 10F of FIG. 10D.
Figure 10G:
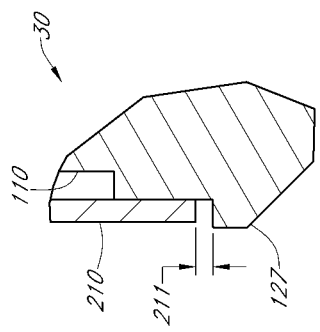
FIG. 10G is an enlarged detail view taken along circle 10G of FIG. 10E.

Note also in FIG. 10F that the metal clad 20 may not protrude beyond the facade of face plate 10 after final forming (see example indicated at FIG. 10F). This is another way to cover exposed edges of the metal cladding for a more finished look and to protect those metal edges. The metal cladding 20 would also not extend behind the rear plane of plastic face plate 10 so it can substantially mount flush against refrigerator door 16.

F. Options and Alternatives

It is to be appreciated that the invention can take many forms and embodiments. Variations obvious to those skilled in the art will be included within the invention. A few examples, by illustration, are set forth below.

The fastening of metal cladding 20 to face plate 10 can utilize the combination of methods described in the exemplary embodiment above or can use a subset of those methods. In a very simple form, one wrapped edge of metal cladding 20 could be used relative to a corresponding projection or edge of an underlying object (e.g. face plate). The wrapping would hold cladding 20 against movement at least in one direction. This may be sufficient for fastening. Crimping may or may not be used. On the other hand, wrapping and/or crimping of one part of the cladding could be combined with covering an exposed edge of the cladding with a raised rib or ribs. Wrapping could deter movement of cladding 20 at least in one direction relative to facade. The raised lip(s) could cover and could resist movement of the cladding 20 in a second direction relative facade. Still further, as indicated by the example of ears 250 in the exemplary embodiments, one or more of wrapping, crimping, or raised ribs relative to exposed edges could be combined with extending one or more ears or portions of cladding 20 into an opening or against one or more walls or surfaces of an underlying object in the fashion to restraint movement of the cladding in at least one direction relative to the underlying object. Ear(s) 250 prevent longitudinal up or down movement of cladding 20 because they are restrained by the top and bottom sides 133 and 137 of the bottom opening 130 of face plate 10. In the example of FIG. 3, ear 250 is substantially perpendicular to the front face of cladding 20, but it could be almost any oblique angle. It can therefore be seen that different combinations of these methods could be mixed or matched for a given application.

Also, wrapping and/or crimping plural portions of cladding 20 to spaced apart locations on the underlying object is another option. For example, wrapping and crimping opposite sides of an underlying object could provide additional fastening force compared to wrapping and crimping one side or edge.

Still further, wrapping and crimping more than two pieces of cladding 20 to a single underlying object is possible.

Of course metal cladding 20 can be configured in a variety of forms for a variety of façades. The facade or the cladding may or may not include openings. The wrapped edge or edges could be along a side, an interior edge, or other structure associated with the underlying facade or object.

Materials used for the components of assembly 30 can vary.

The exemplary embodiments describe a metal cladding over a plastic face plate to frame an ice/water dispenser on the door of a refrigerator. The aspects of the invention illustrated by exemplary embodiments can be applied in analogous ways for façades other than a frame around an ice/water dispenser on a refrigerator. The cladding could be formed to follow a configuration of an underlying facade and be applied to at least one or more of the following:

a. wrap around an edge of the façade;
b. wrap and crimp around one portion or edge of a façade;
c. substantially cover an exposed edge of cladding with a boss, lip, or rib in the facade; and
d. extend an obliquely positioned ear or flange of the cladding relative to one or more surfaces or walls in the facade; to cover part(s) of the facade from direct view and/or serve as a mechanical stop(s) against movement of the cladding relative to the façade.

For example, the metal clad facade according to the invention could be applied to a plastic or other material framing a television or computer display to give it a metal look. It could be used over a plastic or cheaper material in an automobile dashboard or console; or even exterior trim. Examples are almost limitless. It would take advantage of geometry of the underlying device or object to assist in securement of the cladding.

It is to be further understood, however, that there could be a variety of different design choices for assembly 30 as applied to a face plate around an in-door ice/water dispenser of a refrigerator.

For example, FIGS. 7A-D illustrate a slightly different face plate 10B than that of FIGS. 5 and 6A-E. It is almost identical to face plate 10 of FIGS. 5 and 6A-E with the following principle difference. The side edges 104B and 108B (FIG. 7C) are substantially shorter than edges 104 and 108 of face plate 10 (compare FIG. 7C with FIG. 6D). Edges 104B and 108B are still configured to allow wrapping by bending and crimping for metal cladding 20 to plastic face plate 10B. This is to illustrate that different geometries are possible for bending and crimping edges of metal cladding around edges of an underlying object. Also, it illustrates that an inventory of different face plates to fit different refrigerators could utilize the same metal cladding 20 in certain instances.

FIG. 8 and FIGS. 9A-D show another example of a variation of assembly 30. In this case, plastic face plate 10C is similar to face plates 10 and 10B of FIGS. 6A-E and 7A-D with the following principle differences. Face plate 10C has no outwardly forwardly extending ribs to protect horizontal edges of cladding 20. It also does not include recesses 110, 112, and 114 for adhesive or adhesive tape. This is intended to illustrate that, in one embodiment, attachment of metal cladding 20 to plastic face plate 10C relies upon wrapping and crimping opposite vertical sides 204 and 208 around opposite vertical edges 104 and 108. Additionally, the embodiment of FIG. 8 could also wrap and crimp ears 250 on opposite sides of opening 130 of plastic face plate 10C. By simply wrapping and crimping, and without adhesive or edge protecting and retaining lips, cladding 20 can be fastened to face plate 10C.

Other variations are possible. It will be appreciated that other variations and alternatives obvious to those skilled in the art will be included within the scope of the invention.

What is claimed is:

1. A part or component of an appliance comprising:
   a. a substantially non-metal body having a top, a bottom, a front side with a face comprising at least one outer-facing, surface, a back side, and at least one sidewall between the front side and back side, the sidewall having an elongated rear edge and a thickness, the face of the body having an opening;
   b. a thin metal sheet cladding overlaid to and substantially covering the face of the body, the cladding comprising a first portion complementarily shaped to and at least substantially closely conformingly covering the at least one outer-facing surface of the face of the body and a second portion having a distal edge bent or wrapped along the sidewall of the body around the sidewall, the rear edge of sidewalk and the thickness of the rear edge of the sidewall back towards the first portion of the cladding to provide mechanical resistance against movement of the cladding relative to the underlying body and present a metal façade for the substantially non-metal body by substantially hiding the face of the body and hiding both at least part of the sidewall and rear edge of the body and the distal edge of the bent or wrapped second portion of the cladding, further comprising an ear of the cladding extending rearwardly from the first portion of the cladding at an oblique angle from the cladding into the opening of the body and having top and bottom edges which abut the body of the part or component at the opening in the body to restrain relative movement between the cladding and the body.

2. The part or component of claim 1 further comprising a third portion bent or wrapped around another sidewall and rear edge of the outer-facing surface.

3. The part or component of claim 2 wherein the second and third portions are at or near opposite sides of the outer-facing surface.

4. The part or component of claim 2 wherein the second and third portions are wrapped in different directions relative the part or component.

5. The part or component of claim 1 wherein the part or component comprises a face plate having a mounting structure for mounting to another object.

6. The part or component of claim 5 wherein the another object comprises an appliance and the face plate comprises a face plate for the appliance.

7. The part or component of claim 6 wherein the appliance comprises a refrigerator and the face plate is adapted to be operatively positioned relative to an in-door water or ice dispenser of the refrigerator.

8. The part or component of claim 1 in combination with an appliance.

9. The part or component of claim 8 wherein the appliance comprises a refrigerator.

10. A metal-appearing substantially non-metal part of an appliance comprising:
  a. a substantially non-metal base having a top, bottom, a front side with a face comprising at least one outer-facing surface, a back side, and at least one sidewall between the front side and back side and the top and bottom terminating in an elongated rear edge, the sidewall having a thickness, and at least one boss raised from the outer-facing surface;
  b. a thin metal sheet cladding with an opening mounted in a conforming, covering relationship over at least a part of the base to substantially hide the face of the base except at the opening in the cladding, the cladding having at least one portion wrapped along the at least one sidewall of the base around the sidewall, the rear edge of the sidewall, and around the thickness of the rear edge of the sidewall back towards the cladding to at least partially hide the edge of the base and provide mechanical resistance against movement of the cladding relative to the base, and the cladding having at least one cladding edge positioned adjacent the boss of the base to at least substantial hide and protect the cladding edge further comprising an ear of the cladding extending rearwardly from a portion of the cladding at an oblique angle from the cladding into an opening or relative one or more surfaces or walls of the base and having top and bottom edges which abut the base at the opening or one or more surfaces or walls of the base to restrain relative movement between the cladding and the base;
  c. so that the base and metal cladding present a metal façade for the substantially non-metal part of the appliance.

11. A part or component of an appliance comprising:
  a. a substantially non-metal body having a face comprising at least one outer-facing surface and at least one edge, and including an opening in the face of the body;
  b. a thin metal sheet cladding overlaid to and substantially covering the face of the body, the cladding comprising a first portion complementarily shaped and at least substantially closely conformingly covering the at least one outer-facing surface of the face of the body and a second portion having a distal edge bent or wrapped around the at least one perimeter edge of the face of the body and back towards itself to provide mechanical resistance against movement of the cladding relative to the underlying body and present a metal façade for the substantially non-metal part or component by substantially hiding the face of the body and hiding both at least part of the perimeter edge of the body and the distal edge of the bent or wrapped second portion of the cladding, an ear of the cladding extending rearwardly from the first portion of the cladding into the opening in the body and having top and bottom edges which abut opposite sides of the opening in the body.

* * * * *